United States Patent
Kitaura (10) Patent No.: US 12,455,370 B2
(45) Date of Patent: Oct. 28, 2025

(54) OBJECT TRACKING APPARATUS AND OBJECT TRACKING METHOD

(71) Applicant: DENSO CORPORATION, Kariya (JP)

(72) Inventor: Kosuke Kitaura, Kariya (JP)

(73) Assignee: DENSO CORPORATION, Kariya (JP)

( * ) Notice: Subject to any disclaimer, the term of this patent is extended or adjusted under 35 U.S.C. 154(b) by 344 days.

(21) Appl. No.: 18/163,159

(22) Filed: Feb. 1, 2023

(65) Prior Publication Data

US 2023/0243963 A1    Aug. 3, 2023

(30) Foreign Application Priority Data

Feb. 3, 2022  (JP) .................................. 2022-015364

(51) Int. Cl.
  *G01S 13/931*  (2020.01)
  *G01S 13/86*  (2006.01)
(52) U.S. Cl.
  CPC .......... *G01S 13/931* (2013.01); *G01S 13/867* (2013.01); *G01S 2013/93185* (2020.01); *G01S 2013/93271* (2020.01)
(58) Field of Classification Search
  CPC .................................................. G01S 7/4052
  See application file for complete search history.

(56) References Cited

U.S. PATENT DOCUMENTS

2019/0187250 A1\* 6/2019 Ru ........................ G01S 7/4052
2021/0089843 A1\* 3/2021 Mizoguchi ............ G01S 13/931
2021/0316723 A1\* 10/2021 Yamakawa ........... G01S 13/931
2021/0404145 A1\* 12/2021 Endo ..................... G01S 13/931
2021/0405186 A1\* 12/2021 Kim ...................... G01S 13/931
2022/0187442 A1\* 6/2022 Kang .................... G01S 7/4052

FOREIGN PATENT DOCUMENTS

DE    102018208992 A1 \* 12/2019 ........... G01S 13/931
JP        4082442 B2     4/2008

OTHER PUBLICATIONS

Jan C. Becker, Adaptive Information Filter for the Fusion of Data from the Object-Detecting Sensors of an Autonomous Vehicle, IFAC Proceedings Volumes. vol. 33, Issue 9, 2000, pp. 247-252, ISSN 1474-6670.

\* cited by examiner

*Primary Examiner* — Bernarr E Gregory
(74) *Attorney, Agent, or Firm* — Maschoff Brennan (57) ABSTRACT

In an object tracking apparatus, a first acquiring unit acquires first information including first position information indicating a position of a first object detected by a first external sensor that monitors a first area and first identification information for identifying the first object. A second acquiring unit acquires second information including second position information indicating a position of a second object detected by a second external sensor that monitors a second area and second identification information for identifying the second object. An integrating unit integrates the first information and the second information by recording the second identification information of the second information in the first information and deleting the second information, in response to determining that the first object and the second object that are simultaneously detected in an overlapping area in which the first area and the second area overlap each other are the same object.

15 Claims, 6 Drawing Sheets

OBJECT TRACKING APPARATUS AND OBJECT TRACKING METHOD

CROSS-REFERENCE TO RELATED APPLICATION

This application is based on and claims the benefit of priority from Japanese Patent Application No. 2022-015364, filed on Feb. 3, 2022. The entire disclosure of the above application is incorporated herein by reference.

BACKGROUND

Technical Field

The present disclosure relates to an object tracking apparatus and an object tracking method.

Related Art

An onboard radar apparatus including a millimeter-wave radar and a camera is known, in which the millimeter-wave radar detects a target that is present in a predetermined area ahead of a vehicle, and the camera captures an image of an area that is wider than the predetermined area and encompasses the predetermined area. The radar apparatus calculates, using information from the millimeter-wave radar, a distance between the vehicle and the target, a relative speed of the target relative to the vehicle, and an orientation of the target relative to the vehicle. The radar apparatus also corrects, using information from the camera, the orientation of the target relative to the vehicle.

SUMMARY

One aspect of the present disclosure provides an object tracking apparatus. The object tracking apparatus acquires first information that includes first position information indicating a position of a first object that is detected by a first external sensor that monitors a first area that is positioned in a first direction relative to a vehicle and first identification information for identifying the first object. The object tracking apparatus acquires second information that includes second position information indicating a position of a second object that is detected by a second external sensor that monitors a second area that is positioned in a second direction that differs from the first direction relative to the vehicle and second identification information for identifying the second object. The first area and the second area include an overlapping area in which portions of the first area and the second area overlap each other. The object tracking apparatus determines whether the first object and the second object that are simultaneously detected in the overlapping area are the same object using the first information and the second information. In response to determining that the first object and the second object that are simultaneously detected in the overlapping area are the same object, the object tracking apparatus integrates the first information and the second information by recording the second identification information of the second information in the first information and deleting the second information.

DESCRIPTION OF THE EMBODIMENTS

Japanese Patent Publication No. 4082442 discloses an onboard radar apparatus that includes a millimeter-wave radar and a camera. The millimeter-wave radar detects a target that is present in a predetermined area ahead of a vehicle. The camera captures an image of an area that is wider than the predetermined area and encompasses the predetermined area. The radar apparatus calculates, using information from the millimeter-wave radar, a distance between the vehicle and the target, a relative speed of the target relative to the vehicle, and an orientation of the target relative to the vehicle. The radar apparatus also corrects, using information from the camera, the orientation of the target relative to the vehicle.

For example, when a vicinity of a vehicle is monitored by an external sensor such as the millimeter-wave sensor or the camera in Japanese Patent Publication No. 4082442, an area that can be monitored is limited if only a single external sensor is provided. Therefore, the inventors of the present disclosure have examined widening the area that can be monitored by providing a plurality of external sensors. In addition, the inventors have examined overlapping edge portions of adjacent areas to prevent formation of blind spots between the areas that are monitored by the sensors.

The inventors have found that, if the edge portions of adjacent areas are overlapped, even when only a single object is present in an overlapping portion in which the edge portions of two areas overlap, because the object is simultaneously detected by the external sensor that monitors one area and the external sensor that monitors the other area, an erroneous recognition that two objects are present in the overlapping portion may occur. Moreover, the inventors have found that, in a case where an object that moves from one to the other of adjacent areas is tracked, regardless of the object being tracked by the external sensor that monitors one area and the object being tracked by the external sensor that monitors the other area being the same object, an erroneous recognition that the objects are differing objects may occur and tracking of the object may be interrupted.

The present disclosure can be implemented according to a following aspect.

A first exemplary embodiment of the present disclosure provides an object tracking apparatus. The object tracking apparatus includes: a first acquiring unit that acquires first information that includes first position information indicating a position of a first object that is detected by a first external sensor that monitors a first area that is positioned in a first direction relative to a vehicle and first identification information for identifying the first object; a second acquiring unit that acquires second information that includes second position information indicating a position of a second object that is detected by a second external sensor that monitors a second area that is positioned in a second direction that differs from the first direction relative to the vehicle and second identification information for identifying the second object; and an integrating unit that integrates the first information and the second information.

In the object tracking apparatus, the first area and the second area include an overlapping area in which edge portions of the first area and the second area overlap each other. The integrating unit determines whether the first object and the second object that are simultaneously detected in the overlapping area are the same object using the first information and the second information. In response to determining that the first object and the second object that are simultaneously detected in the overlapping area are the same object, the integrating unit integrates the first information and the second information by recording the second identification information of the second information in the first information and deleting the second information.

A second exemplary embodiment of the present disclosure provides an object tracking method. The object tracking method includes: a first acquiring step of acquiring first information that includes first position information indicating a position of a first object that is detected by a first external sensor that monitors a first area that is positioned in a first direction relative to a vehicle and first identification information for identifying the first object; a second acquiring step of acquiring second information that includes second position information indicating a position of a second object that is detected by a second external sensor that monitors a second area that is positioned in a second direction that differs from the first direction relative to the vehicle and second identification information for identifying the second object; and an integrating step of integrating the first information and the second information.

In the object tracking method, the first area and the second area include an overlapping area in which edge portions of the first area and the second area overlap each other. The integrating step includes: determining whether the first object and the second object that are simultaneously detected in the overlapping area are the same object using the first information and the second information; and integrating the first information and the second information by the second identification information of the second information being recorded in the first information and deleting the second information, in response to determining that the first object and the second object that are simultaneously detected in the overlapping area are the same object.

A third exemplary embodiment of the present disclosure provides an object tracking system. The object tracking system includes: a processor; a non-transitory computer-readable storage medium; and a set of computer-executable instructions stored in the computer-readable storage medium that, when read and executed by the processor, cause the processor to implement: (i) acquiring first information that includes first position information indicating a position of a first object that is detected by a first external sensor that monitors a first area that is positioned in a first direction relative to a vehicle and first identification information for identifying the first object; (ii) acquiring second information that includes second position information indicating a position of a second object that is detected by a second external sensor that monitors a second area that is positioned in a second direction that differs from the first direction relative to the vehicle and second identification information for identifying the second object, the first area and the second area including an overlapping area in which edge portions of the first area and the second area overlap each other; (iii) determining whether the first object and the second object that are simultaneously detected in the overlapping area are the same object using the first information and the second information; and (iv) in response to determining that the first object and the second object that are simultaneously detected in the overlapping area are the same object, integrating the first information and the second information by recording the second identification information of the second information in the first information and deleting the second information.

According to the above-mentioned embodiments, when the second object is detected by the second external sensor simultaneously with the first object being detected by the first external sensor in the overlapping area that is monitored by the first external sensor and the second external sensor, whether the first object and the second object are the same object is determined.

When determined that the first object and the second object are the same object, the integrating unit integrates the first information and the second information by recording the second identification information for identifying the second object included in the second information that is related to the second object in the first information that is related to the first object, and deleting the second information. Consequently, when a single object that is present in the overlapping area is simultaneously detected by the first external sensor and the second external sensor, misrecognition of the single object as being two objects being present in the overlapping area can be suppressed.

In addition, the integrating unit integrates the first information and the second information by recording the second identification information in the first information and deleting the second information. Therefore, the first object that is detected by the first external sensor can be recognized as being the same object as the second object that is detected by the second external sensor. Consequently, tracking of an object being interrupted by the first object and the second object being erroneously recognized as differing objects can be suppressed.

A. First Embodiment

Figure 1:
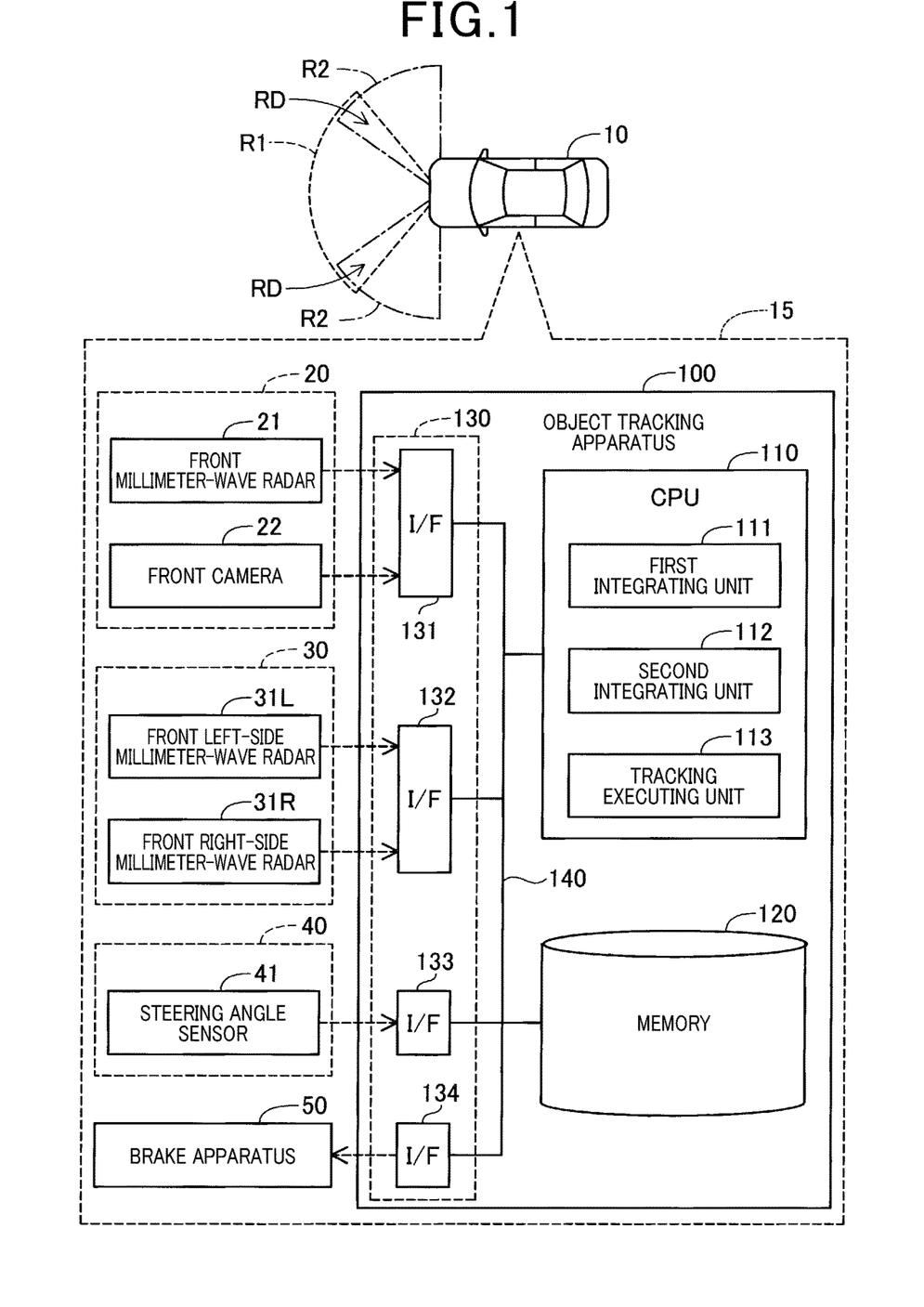
FIG. 1 is an explanatory diagram illustrating an overall configuration of a vehicle that includes an object tracking apparatus.

As shown in FIG. 1, an object tracking apparatus 100 according to a first embodiment is mounted to a vehicle 10. The object tracking apparatus 100 tracks an object that is present in the vicinity of the vehicle 10. According to the present embodiment, the vehicle 10 is an automobile. For example, the object may refer to a pedestrian, a bicycle, another vehicle, or an obstacle. In the descriptions below, to differentiate the vehicle 10 from other vehicles, the vehicle 10 is referred to as an own vehicle 10. Other vehicles are referred to as another vehicle. Here, for example, the own vehicle 10 may be a motorcycle instead of an automobile.

An automated driving (also referred to as autonomous driving) control system 15 is mounted to the own vehicle 10. According to the present embodiment, the automated driving control system 15 includes a first external sensor 20, a second external sensor 30, an internal sensor 40, a brake apparatus 50, and the above-described object tracking apparatus 100.

The first external sensor 20 monitors a front area R1 that is positioned ahead of the own vehicle 10 and detects an object that is present in the front area R1. According to the present embodiment, the first external sensor 20 includes a front millimeter-wave radar 21 and a front camera 22.

The front millimeter-wave radar 21 is a millimeter-wave radar that emits millimeter waves to the front area R1 and detects an object that is present in the front area R1. The front millimeter-wave radar 21 measures a position and a relative speed of the object relative to the own vehicle 10.

According to the present embodiment, the front millimeter-wave radar 21 generates first position information that indicates the position of the object relative to the own vehicle 10, first speed information that indicates the relative speed of the object relative to the own vehicle 10, first detection frequency information that indicates a number of times the detected object has been detected, and first identification information that is used to identify the detected object. The front millimeter-wave radar 21 then transmits the first position information, the first speed information, the first detection frequency information, and the first identification information to the object tracking apparatus 100.

For example, the first identification information may be expressed by a combination of a symbol and a number. When the same object as an object that is detected at a previous detection timing is detected, the front millimeter-wave radar 21 generates the first identification information that has the same content as the first identification information of the object detected at the previous detection timing. When a plurality of objects are detected, the front millimeter-wave radar 21 generates the first position information, the first speed information, the first detection frequency information, and the first identification information related to each object, and transmits the first position information, the first speed information, the first detection frequency information, and the first identification information to the object tracking apparatus 100.

The front camera 22 is a camera that captures an image of the front area R1. The front camera 22 detects an object that is present in the front area R1 by analyzing the acquired captured image of the front area R1. In addition, the front camera 22 identifies a type of the detected object. For example, the type of the object may be a pedestrian, a bicycle, another vehicle, or an obstacle. According to the present embodiment, the front camera 22 generates classification information that indicates the type of the object and transmits the classification information to the object tracking apparatus 100. When a plurality of objects are detected, the front camera 22 generates the classification information related to each object and transmits the classification information to the object tracking apparatus 100.

In the descriptions below, an object that is detected by the first external sensor 20 may be referred to as a first object. A frontward direction may be referred to as a first direction. The front area R1 may be referred to as a first area R1. The information that is generated by the first external sensor 20 may be referred to as first information. According to the present embodiment, the first information includes the first position information, the first speed information, the first detection frequency information, the first identification information, and the classification information. When the first external sensor 20 simultaneously detects a plurality of objects, a plurality of sets of the first information is generated.

The second external sensor 30 monitors a front side area R2 that is positioned on a front left side of the own vehicle 10 and a front side area R2 that is positioned on a front right side of the own vehicle 10, and detects an object that is present in each front side area R2. The front left side refers to a direction that is ahead and obliquely to the left. The front right side refers to a direction that is ahead and obliquely to the right. The front area R1 and the front side area R2 have an overlapping area RD in which respective edge portions overlap. According to the present embodiment, the second external sensor 30 includes a front left-side millimeter-wave radar 31L and a front right-side millimeter-wave radar 31R.

The front left-side millimeter-wave radar 31L is a millimeter-wave radar that emits millimeter waves to the front side area R2 on the front left side and detects an object that is present in the front side area R2 on the front left side. The front right-side millimeter-wave radar 31R is a millimeter-wave radar that emits millimeter waves to the front side area R2 on the front right side and detects an object that is present in the front side area R2 on the front right side. The front side millimeter-wave radars 31L and 31R each measure the position and the relative speed of the object relative to the own vehicle 10.

According to the present embodiment, the front side millimeter-wave radars 31L and 31R each generate second position information that indicates the position of the object relative to the own vehicle 10, second speed information that indicates the relative speed of the object relative to the own vehicle 10, second detection frequency information that indicates the number of times that the detected object has been detected, and second identification information for identifying the detected object. The front side millimeter-wave radars 31L and 31R each transmit the second position information, the second speed information, the second detection frequency information, and the second identification information to the object tracking apparatus 100.

For example, the second identification information may be expressed by a combination of a symbol and a number. When the same object as an object that is detected at a previous detection timing is detected, the front side millimeter-wave radars 31L and 31R generate the second identification information that has the same content as the second identification information of the object detected at the previous detection timing. When a plurality of objects are detected, the front side millimeter-wave radars 31L and 31R generate the second position information, the second speed information, the second detection frequency information, and the second identification information for each object, and transmit the second position information, the second speed information, the second detection frequency information, and the second identification information to the object tracking apparatus 100.

In the descriptions below, when the front left-side millimeter-wave radar 31L and the front right-side millimeter-wave radar 31R are described without particular differentiation, the front left-side millimeter-wave radar 31L and the front right-side millimeter-wave radar 31R are simply referred to as a front side millimeter-wave radar 31. The object that is detected by the second external sensor 30 may be referred to as a second object. The front side direction may be referred to as a second direction. The front side area R2 may be referred to as a second area R2. The information that is generated by the second external sensor 30 may be referred to as second information.

According to the present embodiment, the second information includes the second position information, the second speed information, the second detection frequency information, and the second identification information. When the second external sensor 30 simultaneously detects a plurality of objects, a plurality of sets of the second information is generated.

The internal sensor 40 detects a moving state of the own vehicle 10. According to the present embodiment, the internal sensor 40 includes a steering angle sensor 41. The steering angle sensor 41 detects a steering angle of the own vehicle 10. Information related to the steering angle detected by the steering angle sensor 41 is transmitted to the object tracking apparatus 100. Here, for example, the internal sensor 40 may include a vehicle speed sensor or a yaw rate sensor in addition to the steering angle sensor 41.

The brake apparatus 50 decelerates or stops the own vehicle 10 by generating a braking force in the own vehicle 10. According to the present embodiment, when a collision between the own vehicle 10 and an object being tracked by the object tracking apparatus 100 is predicted, the collision between the own vehicle 10 and the object can be avoided or impact of the collision between the own vehicle 10 and the object can be mitigated by the brake apparatus 50 being operated without a brake operation from an occupant being received.

The brake apparatus 50 generates a stronger braking force when a collision between the own vehicle 10 and the first object is predicted, compared to when a collision between the own vehicle 10 and the second object is predicted. When the brake apparatus 50 is operated as a result of the collision between the own vehicle 10 and the first object being predicted, the brake apparatus 50 transmits the first identification information of the first object to the object tracking apparatus 100. When the brake apparatus 50 is operated as a result of the collision between the own vehicle 10 and the second object being predicted, the brake apparatus 50 transmits the second identification information of the second object to the object tracking apparatus 100.

The object tracking apparatus 100 is configured as a computer that includes a central processing unit (CPU) 110, a memory 120, an input/output interface 130, and an internal bus 140. The input/output interface 130 outputs and inputs signals to and from outside the object tracking apparatus 100. The input/output interface 130 includes a first interface 130, a second interface 132, a third interface 133, and a fourth interface 134.

The front millimeter-wave radar 21 and the front camera 22 of the first external sensor 20 are connected to the first interface 131. The front left-side millimeter-wave radar 31L and the front right-side millimeter-wave radar 31R of the second external sensor 30 are connected to the second interface 132. The steering angle sensor 41 of the internal sensor 40 is connected to the third interface 133. The brake apparatus 50 is connected to the fourth interface 134.

The CPU 110, the memory 120, and the interfaces 131 to 134 are connected to one another via the internal bus 140. Here, the first interface 131 may be referred to as a first acquiring unit 131. The second interface 132 may be referred to as a second acquiring unit 132. The third interface 133 may be referred to as a third acquiring unit 133. The fourth interface 134 may be referred to as a fourth acquiring unit 134.

The CPU 110 functions as a first integrating unit 111, a second integrating unit 112, and a tracking executing unit 113 by running a program that is stored in the memory 120. The first integrating unit 111 acquires the first position information, the first speed information, the first detection frequency information, and the first identification information that are inputted to the first interface 131 from the front millimeter-wave radar 21, and acquires the classification information that is inputted to the first interface 131 from the front camera 22. The first integrating unit 111 integrates the first position information, the first speed information, the first detection frequency information, and the first identification information that are portions of the first information and the classification information that is a remaining portion of the first information.

According to the present embodiment, the first integrating unit 111 integrates the first position information, the first speed information, the first detection frequency information, the first identification information, and the classification information by adding the classification information to the first position information, the first speed information, the first detection frequency information, and the first identification information. The first information that is integrated by the first integrating unit 111 is transmitted to the second integrating unit 112.

The second integrating unit 112 acquires the first information that is integrated by the first integrating unit 111 and the second information that is inputted to the second interface 132. The second integrating unit 112 determines whether the first object and the second object that are simultaneously detected in the overlapping area RD are the same object. According to the present embodiment, the second integrating unit 112 determines whether the first object and the second object that are simultaneously detected in the overlapping area RD are the same object by performing a same object determination process, described hereafter.

When determined that the first object and the second object that are simultaneously detected in the overlapping area RD are the same object, the second integrating unit 112 generates integrated information that includes the first position information of the first object and the second identification information of the second object that are simultaneously detected in the overlapping area RD, and transmits the integrated information to the tracking executing unit 113.

When not determined that the first object and the second object that are simultaneously detected in the overlapping area RD are the same object, the second integrating unit 112 transmits the first information and the second information to the tracking executing unit 113. Here, the second integrating unit 112 may be simply referred to as an integrating unit 112.

The tracking executing unit 113 tracks an object that is present in the vicinity of the own vehicle 10 using the first information, the second information, and the integrated information. According to the present embodiment, when the first information is acquired from the second integrating unit 112, the tracking executing unit 113 recognizes the position of the object using the first position information that is included in the first information.

When the second information is acquired from the second integrating unit 112, the tracking executing unit 113 recognizes the position of the object using the second position information that is included in the second information. When the integrated information is acquired from the second integrating unit 112, the tracking executing unit 113 recognizes the position of the object using the first position information that is included in the integrated information.

According to the present embodiment, the tracking executing unit 113 predicts whether the object being tracked and the own vehicle 10 will collide. The tracking executing unit 113 can predict whether the object being tracked and the own vehicle 10 will collide using the first information, the second information, and the integrated information. The tracking executing unit 113 transmits a prediction result to the brake apparatus 50.

The prediction result includes the first identification information of the first object that is predicted to collide with the own vehicle 10 and the second identification information of the second object that is predicted to collide with the own vehicle 10. Here, processes performed by the object tracking apparatus 100 including the same object determination process may be referred to as an object tracking method.

Figure 2:
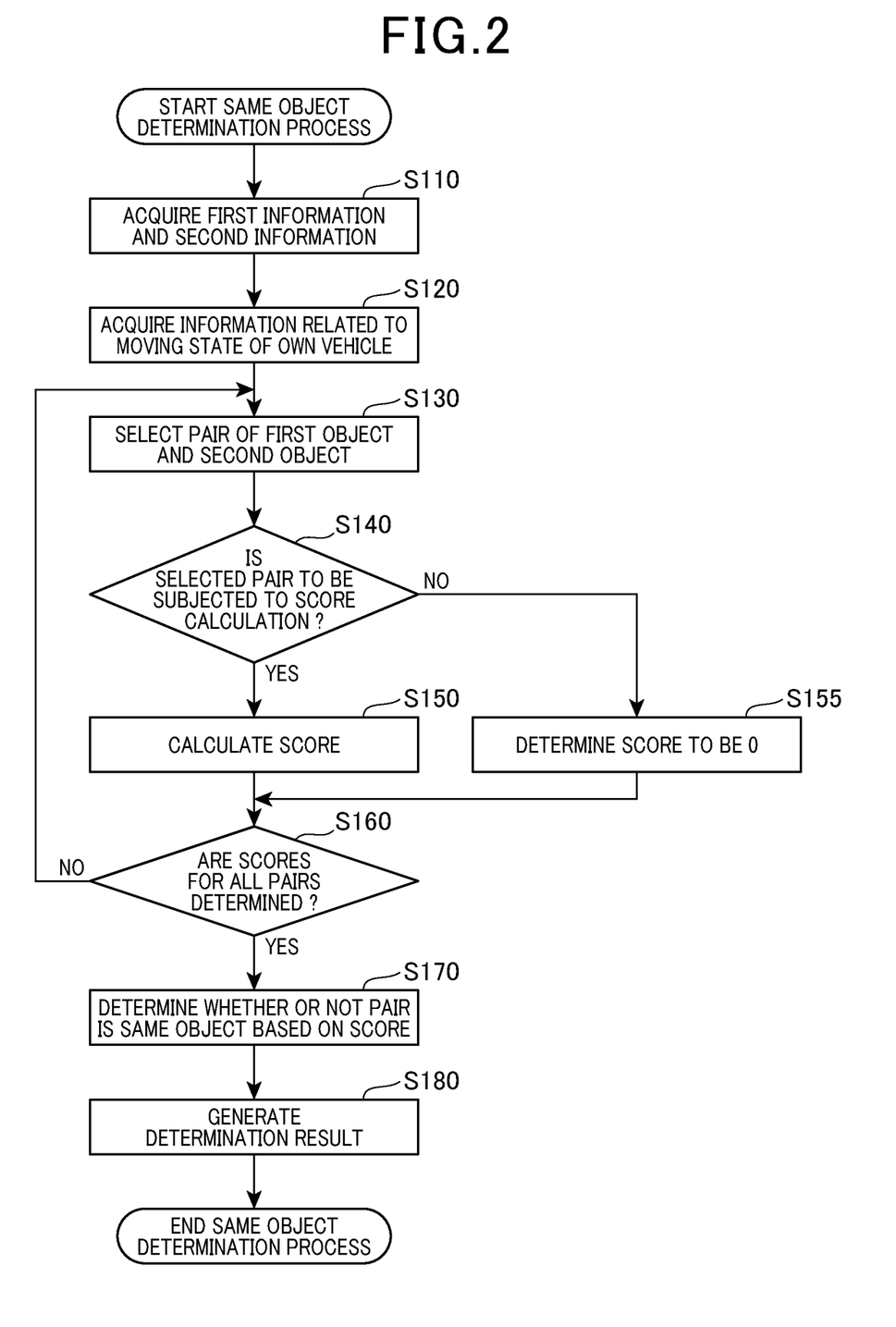
FIG. 2 is a flowchart illustrating details of a same object determination process.

FIG. 2 shows a flowchart of details of the same object determination process performed by the second integrating unit 112. The process is performed by the second integrating unit 112 each time the first information and the second information are inputted to the second integrating unit 112.

First, at step S110, the second integrating unit 112 acquires the first information of the first object that is detected in the overlapping area RD by the first external sensor 20, and the second information of the second object that is detected in the overlapping area RD by the second external sensor 30. Next, at step S120, the second integrating unit 112 acquires the information related to the moving state of the own vehicle 10.

According to the present embodiment, the second integrating unit 112 acquires information related to the steering angle detected by the steering angle sensor 41 and information related to an operating state of the brake apparatus 50 as the information related to the moving state of the own vehicle 10.

Figure 3:
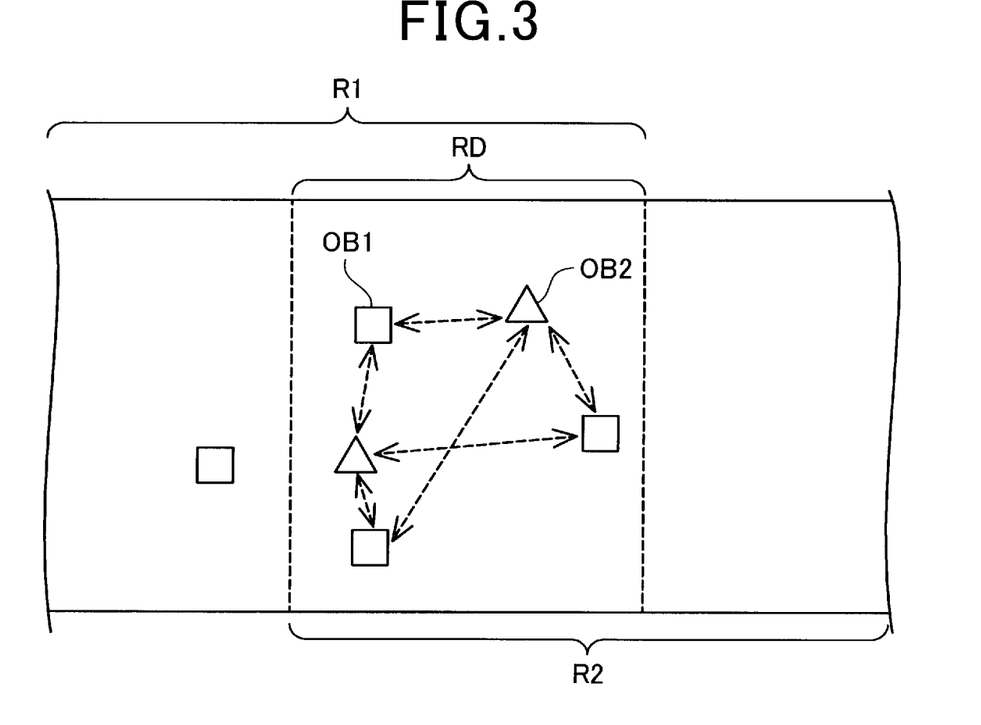
FIG. 3 is an explanatory diagram schematically illustrating combinations of first objects and second objects.

At step S130, the second integrating unit 112 selects a pair among pairs of first objects and second objects that are simultaneously detected in the overlapping area RD. As shown in FIG. 3, for example, when three first objects OB1 and two second objects OB2 are detected in the overlapping area RD, as indicated by broken lines, a total of six pairs is present. In this case, the second integrating unit 112 selects one pair among the six pairs.

At step S140 in FIG. 2, the second integrating unit 112 determines whether the selected pair is to be subjected to score calculation. As described hereafter, the score is used to determine whether the first object OB1 and the second object OB2 that compose the pair are the same object. According to the present embodiment, when at least one of conditions A to E, below, is applicable, the second integrating unit 112 does not subject the selected pair to score calculation.

Condition A is a condition that the first object OB1 and the second object OB2 that compose the pair are already determined to be the same object.

Condition B is a condition that the distance between the own vehicle 10 and the first object OB1 or the distance between the own vehicle 10 and the second object OB2 is equal to or greater than a predetermined distance.

Condition C is a condition that the detection frequency of the first object OB1 or the detection frequency of the second object OB2 is equal to or less than a predetermined frequency.

Condition D is a condition that the vehicle 10 is turning at a predetermined steering angle or greater. For example, the predetermined steering angle can be a steering angle when the own vehicle 10 makes a U-turn.

Condition E is a condition that the type of the first object OB1 included in the pair is another vehicle and the brake apparatus 50 is being operated to prevent a collision between the second object OB2 of the pair and the own vehicle 10.

As a result of the above-described conditions being provided, a pair for which there is little need to determine whether the objects are the same object can be eliminated from being subjected to the score calculation. Calculation load can be reduced.

When determined that the selected pair is to be subjected to score calculation at step S140, at step S150, the second integrating unit 112 calculates the score for determining whether the object OB1 and the object OB2 composing the pair are the same object. According to the present embodiment, the second integrating unit 112 calculates a position score that is based on a degree of similarity between the position of the first object OB1 relative to the own vehicle 10 and the position of the second object OB2 relative to the own vehicle 10, and a speed score that is based on a degree of similarity between the relative speed of the first object OB1 relative to the own vehicle 10 and the relative speed of the second object OB2 relative to the own vehicle 10.

The second integrating unit 112 calculates the score for determining whether the object OB1 and the object OB2 composing the pair are the same object by adding together the position score and the speed score.

The second integrating unit 112 calculates the position score using the first position information in the first information and the second position information in the second information. The position score becomes higher as the degree of similarity between the position of the first object OB1 relative to the own vehicle 10 and the position of the second object OB2 relative to the own vehicle 10 becomes higher.

The second integrating unit 112 calculates the speed score using the first speed information in the first information and the second speed information in the second information. The speed score becomes higher as the degree of similarity between the relative speed of the first object OB1 relative to the own vehicle 10 and the relative speed of the second object OB2 relative to the own vehicle 10 becomes higher. The position score is given greater weight than the speed score.

Here, according to other embodiments, the second integrating unit 112 may calculate a detection frequency score, in addition to the position score and the speed score. The detection frequency score is based on the number of times the first object OB1 is detected and the number of times the second object OB2 is detected. The second integrating unit 112 may use a score that is obtained by adding together the position score, the speed score, and the detection frequency score as the score for determining whether the first object OB and the second object OB2 composing the pair are the same object.

The second integrating unit 112 can calculate the detection frequency score using the first detection frequency information in the first information and the second detection frequency information in the second information. The detection frequency score becomes higher as the number of times that the first object OB1 is detected or the number of times that the second object OB2 is detected becomes higher. In this case, misrecognition in which the first object OB1 that is erroneously detected by the first external sensor 20 being determined to be the same object as the second object OB2 and the second object OB2 that is erroneously detected by the second external sensor 30 being determined to be the same object as the first object OB1 can be suppressed.

When determined that the selected pair is not to be subjected to score calculation at step S140, at step S155, the second integrating unit 112 determines the score for determining whether the first object OB and the second object OB2 composing the pair are the same object to be 0 without calculating the position score and the speed score. As described hereafter, the pair of which the score is 0 is not determined to be the same object.

At step S160, the second integrating unit 112 determines whether the scores of all pairs are determined. When determined that the scores of all pairs are determined at step S160, the second integrating unit 112 advances the process to step S170. When not determined that the scores of all pairs are determined at step S160, the second integrating unit 112 repeats the processes from step S130 to step S160 until the scores of all pairs are determined.

At step S170, the second integrating unit 112 determines whether the first object OB1 and the second object OB2 that are simultaneously detected in the overlapping area RD are the same object. According to the present embodiment, the second integrating unit 112 determines whether the first object OB1 and the second object OB2 composing each pair are the same object based on the score of each pair. Specifically, first, the second integrating unit 112 assigns, to each second object OB2, the first object OB1 of which the score when paired with the second object OB2 is the greatest.

When differing first objects OB1 are assigned to the second objects OB2, the second integrating unit 112 determines that the second object OB2 and the first object OB1 that is assigned to the second object OB2 are the same object. When differing first objects OB1 are not assigned to the second objects OB2, that is, when a single first object OB1 is redundantly assigned to a plurality of second objects OB2, the second integrating unit 112 optimizes the combinations of the first objects OB1 and the second objects OB2 using a combination optimization algorithm such that differing first objects OB1 are assigned to the second objects OB2, and a value obtained as a total of the scores of the pairs is maximum.

Figure 4:
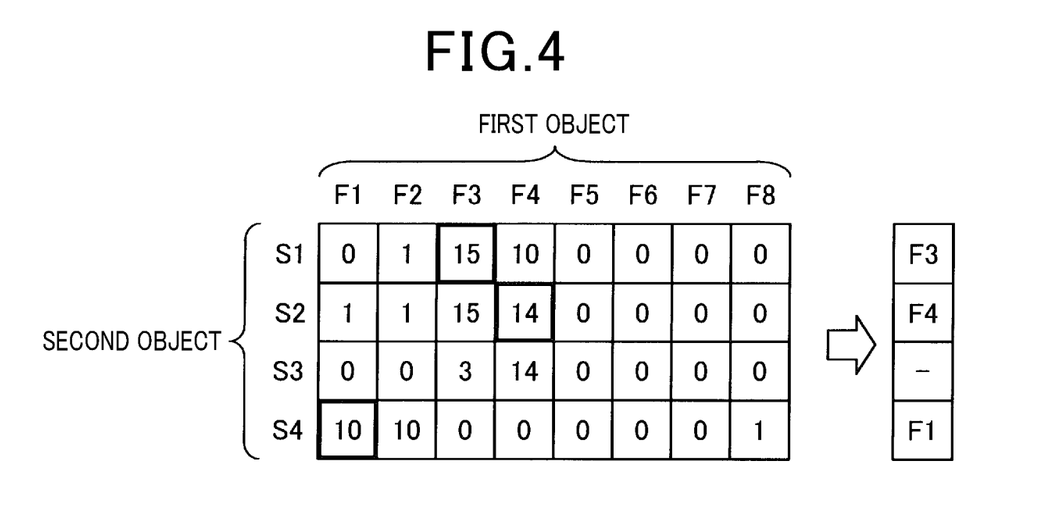
FIG. 4 is an explanatory diagram illustrating a score matrix.

For example, a Global Nearest Neighbor (GNN) approach or a Greedy approach may be used as the combination optimization algorithm. FIG. 4 shows an example in which the combinations of the first objects OB1 and the second objects OB2 are optimized. In this example, S1 and F3 are determined to be the same object, S2 and F4 are determined to be the same object, and S4 and F1 are determined to be the same object. The first object OB1 that is the same object is not present for S3.

Here, when a number of first objects OB1 and a number of second objects OB2 simultaneously detected in the overlapping area RD are respectively 1 and 1, the second integrating unit 112 determines that the first object OB1 and the second object OB2 are the same object when the score of the pair composed by the first object OB1 and the second object OB2 is greater than 0. The second integrating unit 112 does not determine that the first object OB1 and the second object OB2 are the same object when the score is 0.

At step S180 in FIG. 2, the second integrating unit 112 generates a determination result regarding whether the first object OB1 and the second object OB2 that are simultaneously detected in the overlapping area RD are the same object, and stores the determination result in the memory 120. The first identification information and the second identification information related to the first object OB1 and the second object OB2 that are determined to be the same object are indicated in the determination result. Subsequently, the second integrating unit 112 ends this process. As described above, the second integrating unit 112 starts this process again when the first information and the second information are newly inputted to the object tracking apparatus 100.

Here, a portion of step S110 in which the first information is acquired may be referred to as a first acquiring step. A portion of step S110 in which the second information is acquired may be referred to as a second acquiring step. The information that indicates the moving state of the own vehicle 10 may be referred to as third information. A portion of step S120 in which the information indicating the moving state of the own vehicle 10 is acquired may be referred to as a third acquiring step. The information that indicates the operating state of the brake apparatus 50 may be referred to as fourth information. A portion of step S120 in which the information indicating the operating state of the brake apparatus 50 is acquired may be referred to as the fourth acquiring step. Step S130 to step S180 may be referred to as a determining step.

Figure 5:
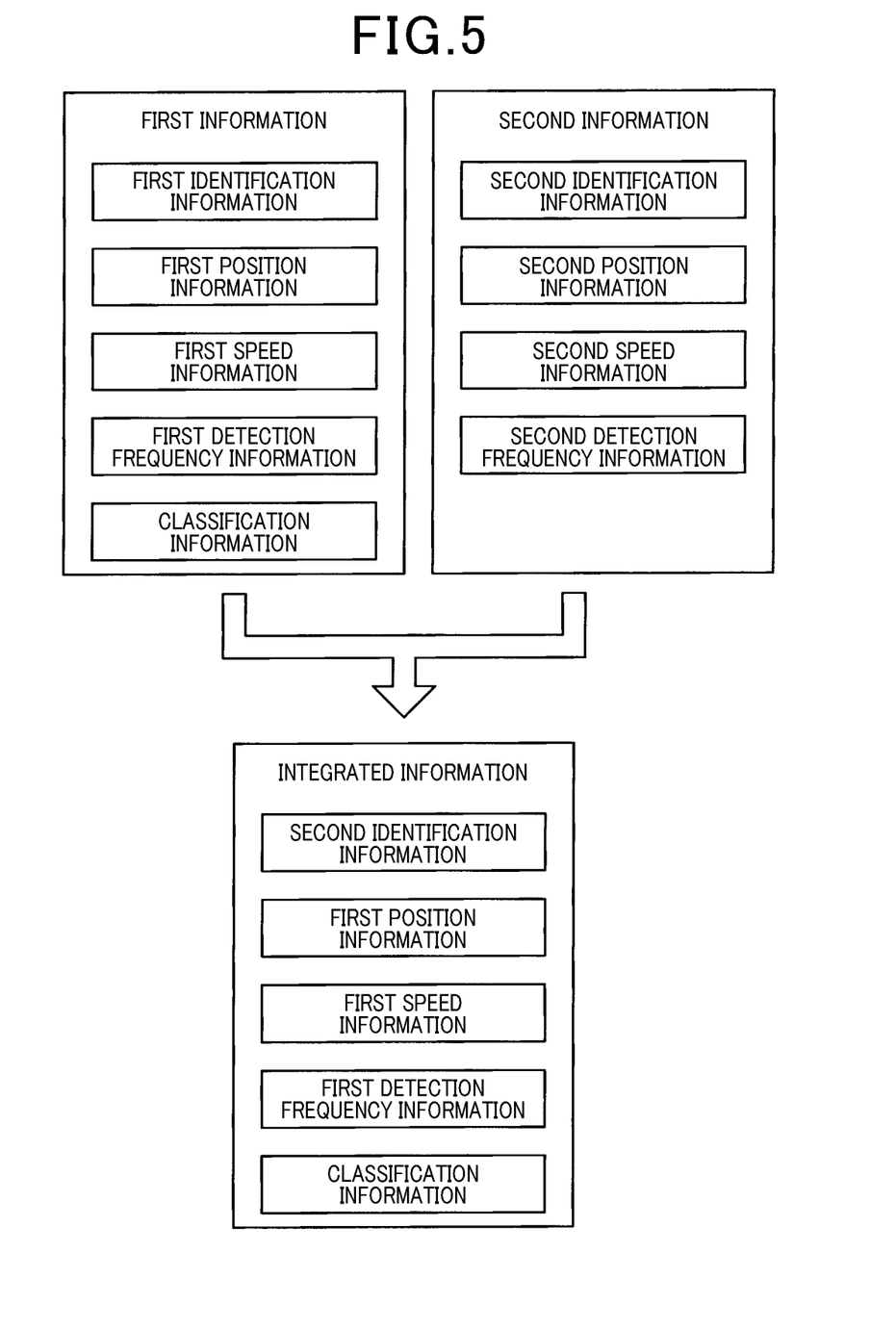
FIG. 5 is an explanatory diagram schematically illustrating integration of first information and second information.

As shown in FIG. 5, when determined that the first object OB1 and the second object OB2 are the same object in the same object determination process, the second integrating unit 112 integrates the first information and the second information related to the first object OB1 and the second object OB1 that are determined to be the same object, and generates the integrated information. According to the present embodiment, the second integrating unit 112 generates the integrated information by overwriting the first identification information included in the first information of the first object OB1 with the second identification information of the second object OB2 that is determined to be the same object as the first object OB1, and recording the overwritten information.

That is, according to the present embodiment, the integrated information includes the first position information, the first speed information, the first detection frequency information, the classification information, and the second identification information. The second integrating unit 112 transmits, to the tracking executing unit 113, the integrated information or, in other words, the first information in which the first identification information is overwritten with the second identification information and deletes the second information. When not determined that the first object OB1 and the second object OB2 are the same object in the same object determination process, the second integrating unit 112 does not generate the integrated information, and transmits the first information and the second information to the tracking executing unit 113.

Subsequently, when the first information and the second information related to the first object OB1 and the second object OB2 that are determined to be the same object are newly acquired, the second integrating unit 112 generates the integrated information by integrating the newly acquired first information and second information. The second integrating unit 112 then deletes the second information and transmits the integrated information to the tracking executing unit 113.

When the first information related to the first object OB1 is newly acquired but the second information related to the second object OB2 that is determined to be the same object as the first object OB1 is not newly acquired, the second integrating unit 112 overwrites the first identification information included in the newly acquired first information with the second identification information of the second object OB2 that is determined to be the same object as the first object OB1, and generates the integrated information.

The second integrating unit 112 then transmits the integrated information to the tracking executing unit 113. The second integrating unit 112 can acquire the second identification information of the second object OB2 that is determined to be the same object as the first object OB1 by referencing the determination result of the same object determination process stored in the memory 120.

Therefore, regarding the first object OB1 and the second object OB2 that are determined to be the same object in the same object determination process, whether the first object OB1 and the second object OB2 are the same object need not be determined again in the same object determination processes that are subsequently performed. Consequently, calculation load of the same object determination process can be reduced.

When the second information related to the second object OB2 is newly acquired but the first information related to the first object OB1 that is determined to be the same object as the second object OB2 is not newly acquired, the second integrating unit 112 does not generate the integrated information and transmits the second information to the tracking executing unit 113. Here, a step of generating the integrated information may be referred to as an integrating step.

Figure 6:
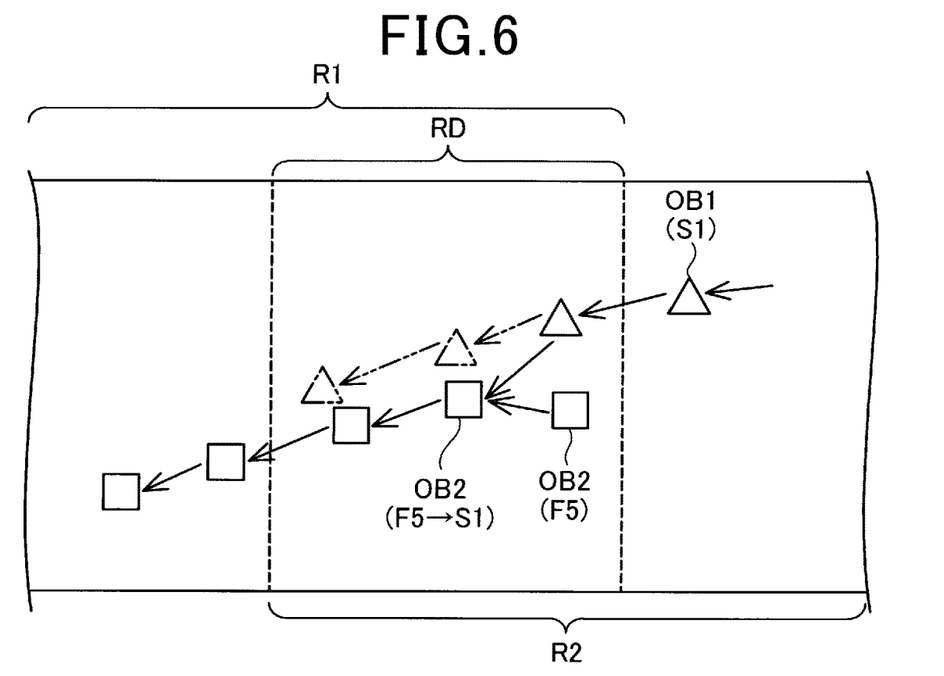
FIG. 6 is an explanatory diagram schematically illustrating tracking of an object by a tracking executing unit.

FIG. 6 schematically shows tracking of an object that moves from the front side area R2 outside the overlapping area RD to the front area R1 outside the overlapping area RD by the tracking executing unit 113. The object that enters the front side area R2 outside the overlapping area RD is detected as the second object OB2 by the second external sensor 30.

In FIG. 6, the second identification information S1 is attached to the second object OB2 by the second external sensor 30. The second information that includes the second position information that indicates the position of the second object OB2 and the second identification information is transmitted to the tracking executing unit 113.

When the object enters the overlapping area RD from the front side area R2 outside the overlapping area RD, the object that enters the overlapping area RD is not only detected as the second object OB2 by the second external sensor 30 but also detected as the first object OB1 by the first external sensor 20.

In FIG. 6, the first identification information F5 is attached to the first object OB1 by the first external sensor 20. When the first object OB1 and the second object OB2 are not determined to be the same object in the same object determination process, the first information that includes the first position information indicating the position of the first object OB1 and the first identification information, and the second information that includes the second position information indicating the position of the second object OB2 and the second identification information are transmitted to the tracking executing unit 113.

At this timing, the tracking executing unit 113 recognizes that two objects are present in the overlapping area RD regardless of only a single object actually being present in the overlapping area RD, because the first information and the second information are transmitted to the tracking executing unit 113. Subsequently, when the first object OB1 and the second object OB2 that move within the overlapping area RD are determined to be the same object in the same object determination process, the integrated information that includes the first position information and the second identification information is transmitted to the tracking executing unit 113, and the second information is no longer transmitted.

Therefore, the tracking executing unit 113 recognizes that a single object is present in the overlapping area RD. The integrated information includes the second identification information S1. Therefore, the tracking executing unit 11 recognizes that the first object OB1 detected in the overlapping area RD is the same object as the second object OB2.

When the object enters the front area R1 outside the overlapping area RD from the overlapping area RD, while the object that enters the front area R1 outside the overlapping area RD is detected as the first object OB1 by the first external sensor 20, the object is no longer detected by the second external sensor 30. Because the first object OB1 is already determined to be the same object as the second object OB2 in the same object determination process, the integrated information is transmitted to the tracking executing unit 113.

As described above, the integrated information includes the second identification information S1. Therefore, the tracking executing unit 113 recognizes the first object OB1 detected in the front area R1 outside the overlapping area RD to be the same object as the second object OB2. Consequently, the tracking executing unit 113 can uninterruptedly track the object that moves from the front side area R2 outside the overlapping area RD, through the overlapping area RD, to the front area R1 outside the overlapping area RD.

Figure 7:
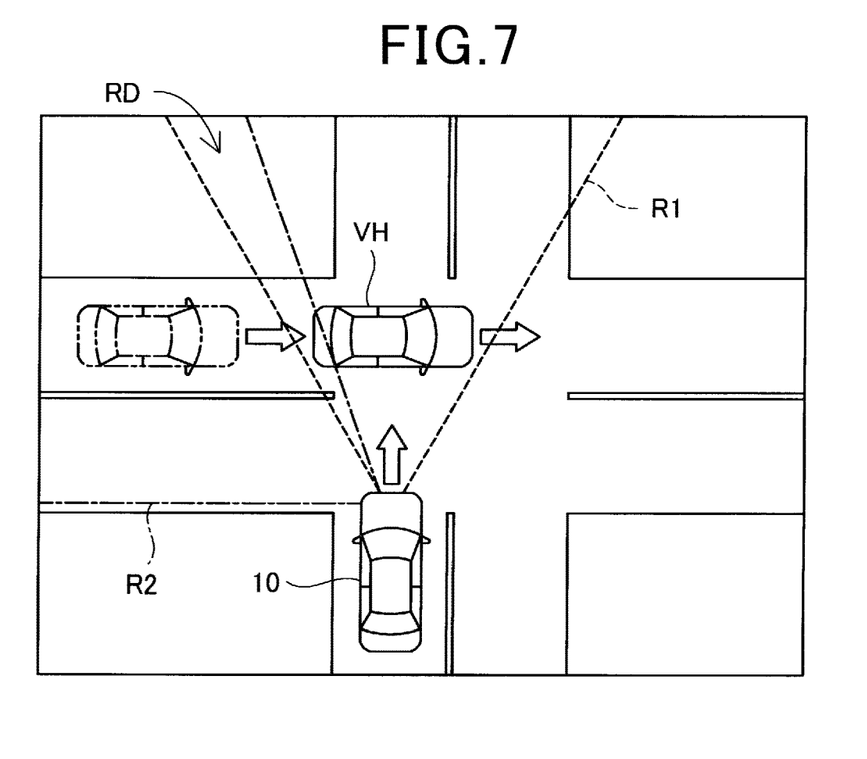
FIG. 7 is an explanatory diagram illustrating avoidance of an intersection collision between an own vehicle and another vehicle.

FIG. 7 shows another vehicle VH entering an intersection from a road that intersects a road on which the own vehicle 10 is traveling, when the own vehicle 10 is attempting to advance straight through the intersection. As a result of the other vehicle VH entering the front side area R2, the other vehicle VH is detected as the second object by the second external sensor 30.

When a collision between the own vehicle 10 and the second object is predicted, the automated driving control system 15 generates a braking force in the own vehicle 10 by the braking apparatus 50. Subsequently, as a result of the other vehicle VH entering the front area R1, the other vehicle VH is detected as the first object by the first external sensor 20. When a collision between the own vehicle 10 and the first object is predicted, the automated driving control system 15 increases the braking force by the brake apparatus 50. Therefore, a likelihood of a collision between the own vehicle 10 and the other vehicle VH can be reduced. When the collision between the own vehicle 10 and the other vehicle VH is unavoidable, impact of the collision between the own vehicle 10 and the other vehicle VH can be mitigated.

In addition, according to the present embodiment, as a result of the first external sensor 20 and the second external sensor 30 being provided in the own vehicle 10, a monitorable range is widened compared to an example in which the first external sensor 20 is provided and the second external sensor 30 is not provided. Therefore, under circumstances described with reference to FIG. 7, another vehicle that approaches the own vehicle 10 can be detected at an early stage and braking of the own vehicle 10 can be started at an early stage. Consequently, the likelihood of a collision between the own vehicle 10 and the other vehicle can be reduced.

Furthermore, according to the present embodiment, the automated driving control system 50 increases the braking force in stages. Therefore, a large impact being applied to the occupant as a result of a strong braking force suddenly being generated can be suppressed.

Moreover, according to the present embodiment, an object that moves from the front side area R2 outside the overlapping area RD, through the overlapping area RD, to the front area R1 outside the overlapping area RD can be uninterruptedly tracked. Consequently, tracking of the object being interrupted and operation of the brake apparatus 50 being interrupted can be suppressed.

Figure 8:
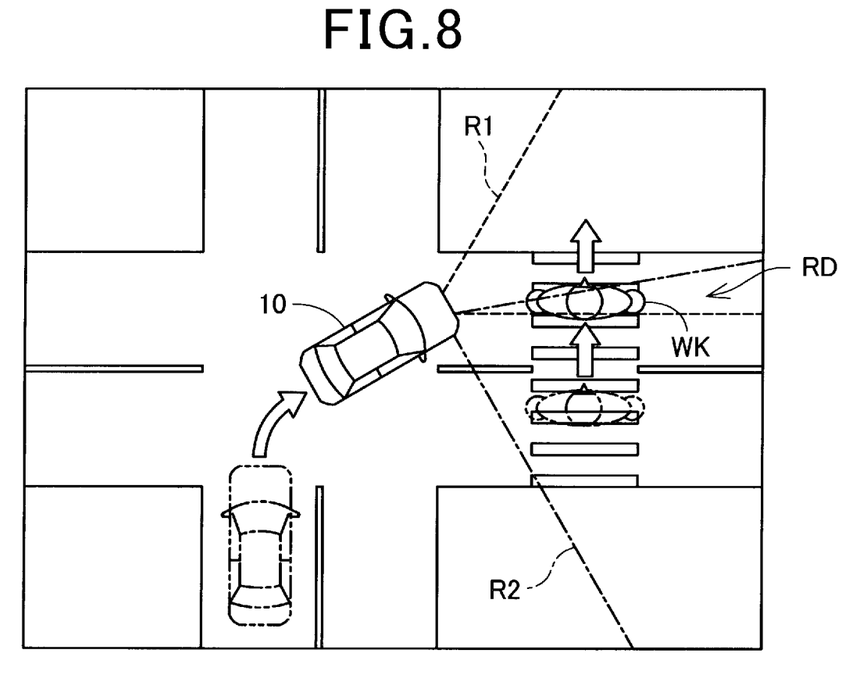
FIG. 8 is an explanatory diagram illustrating avoidance of a left/right-turn collision between an own vehicle and a pedestrian.

FIG. 8 shows a pedestrian WK crossing a crosswalk in the same advancing direction as an advancing direction of the own vehicle 10 before the own vehicle 10 makes a right turn, when the own vehicle 10 is attempting to pass through the crosswalk after making a right turn at an intersection. As a result of the pedestrian WK entering the front side area R2, the pedestrian WK is detected as the second object by the second external sensor 30.

When a collision between the own vehicle 10 and the second object is predicted, the automated driving control system 15 generates a braking force in the own vehicle 10 by the braking apparatus 50. Subsequently, as a result of the pedestrian WK entering the front area R1, the pedestrian WK is detected as the first object by the first external sensor 20. When a collision between the own vehicle 10 and the first object is predicted, the automated driving control system 15 increases the braking force by the brake apparatus 50. Therefore, a likelihood of a collision between the own vehicle 10 and the pedestrian WK can be reduced. When the collision between the own vehicle 10 and the pedestrian WK is unavoidable, impact of the collision between the own vehicle 10 and the pedestrian WK can be mitigated.

In addition, according to the present embodiment, as a result of the first external sensor 20 and the second external sensor 30 being provided in the own vehicle 10, the monitorable range is widened compared to an example in which the first external sensor 20 is provided and the second external sensor 30 is not provided. Therefore, under circumstances described with reference to FIG. 8, the pedestrian WK can be more easily detected.

Furthermore, according to the present embodiment, an object that moves from the front side area R2 outside the overlapping area RD, through the overlapping area RD, to the front area R1 outside the overlapping area RD can be uninterruptedly tracked. Consequently, tracking of the object being interrupted and operation of the brake apparatus 50 being interrupted can be suppressed.

As a result of the object tracking apparatus 100 according to the present embodiment described above, when the second object OB2 is detected by the second external sensor 30 simultaneously with the first object OB1 being detected by the first external sensor 20 in the overlapping area RD that is monitored by the first external sensor 20 and the second external sensor 30, and the first information related to the first object OB1 and the second information related to the second object OB2 are acquired, the second integrating unit 112 determines whether the first object OB1 and the second object OB2 are the same object by the same object determination process.

When determined that the first object OB1 and the second object OB2 are the same object in the same object determination process, the second integrating unit 112 generates the integrated information by overwriting the first identification information in the first information with the second identification information in the second information. The second integrating unit 112 transmits the integrated information to the tracking executing unit 113 and deletes the second information. The tracking executing unit 113 recognizes the position of the object present in the overlapping area RD using the first position information included in the integrated information.

Therefore, when a single object that is present in the overlapping area RD is simultaneously detected by the first external sensor 20 and the second external sensor 30, the tracking executing unit 113 erroneously recognizing two objects being present in the overlapping area RD can be suppressed. Furthermore, according to the present embodiment, even when the first information is newly acquired after determining that the first object OB1 and the second object OB2 are the same object in the same object determination process, the second integrating unit 112 generates the integrated information by overwriting the first identification information in the newly acquired first information with the second identification information, and transmits the integrated information to the tracking executing unit 113.

Therefore, the tracking executing unit 113 can recognize that the second object OB2 that moves from the front side area R2 outside the overlapping area RD to the overlapping area RD and the first object OB1 that moves from the overlapping area RD to the front area R1 outside the overlapping area RD are the same object. Consequently, the tracking executing unit 113 erroneously recognizing that the second object OB2 that moves from the front side area R2 outside the overlapping area RD to the overlapping area RD and the first object OB1 that moves from the overlapping area RD to the front area R1 outside the overlapping area RD are differing objects, and tracking of the object being interrupted can be suppressed.

In addition, according to the present embodiment, in the same object determination process, the second integrating unit 112 calculates the position score that is based on the degree of similarity between the position of the first object OB1 relative to the own vehicle 10 indicated in the first position information and the position of the second object OB2 relative to the own vehicle 10 indicated in the second position information.

The second integrating unit 112 also calculates the speed score that is based on the degree of similarity between the relative speed of the first object OB1 relative to the own vehicle 10 indicated in the first speed information and the relative speed of the second object OB2 relative to the own vehicle 10 indicated in the second speed information.

The second integrating unit 112 then determines whether the first object OB1 and the second object OB2 are the same object based on the score that is obtained by adding together the position score and the speed score. Consequently, the first object OB1 and the second object OB2 being erroneously determined to be the same object regardless of being differing objects can be suppressed.

Furthermore, according to the present embodiment, in the same object determination process, when the moving state of the own vehicle 10 is turning at a predetermined steering angle or greater, the second integrating unit 112 omits calculation of the score for determining whether the first object OB1 and the second object OB2 are the same object and determines the score to be 0.

For example, during a turn at a large steering angle, such as during a U-turn, the circumstances described with reference to FIG. 7 or the circumstances described with reference to FIG. 8 are unlikely. Therefore, when the moving state of the own vehicle 10 is turning at a predetermined steering angle or greater, calculation of the score for determining whether the first object OB1 and the second object OB2 are the same object is omitted. Consequently, calculation load can be reduced.

In addition, according to the present embodiment, in the same object determination process, when the type of the first object OB1 detected in the overlapping area RD is another vehicle, the second integrating unit 112 calculates the score for determining whether the first object OB1 and the second object OB2 are the same object only when the moving state of the own vehicle 10 is braking to avoid a collision with the second object OB2. Therefore, as described with reference to FIG. 7, a large impact being applied to the occupant of the own vehicle 10 as a result of a strong braking force being suddenly generated can be suppressed.

Furthermore, according to the present embodiment, when a plurality of first objects OB1 and a plurality of second objects OB2 are simultaneously detected in the overlapping area RD, in the same object determination process, the second integrating unit 112 calculates the score for determining whether the first object OB1 and the second object OB2 are the same object for each pair that is composed of the first object OB1 and the second object OB2, and determines whether the first object OB1 and the second object OB2 are the same object based on the score of each pair.

In particular, according to the present embodiment, when whether the first object OB1 and the second object OB2 are the same object is determined based on the score of each pair, if a single first object OB1 is a candidate for the same object for a plurality of second objects OB1, the second integrating unit 112 optimizes the combinations of the first objects OB1 and the second objects OB2 using the combination optimization algorithm such that a single first object OB1 is not a candidate for the same object for a plurality of second objects OB2. Consequently, even when a plurality of first objects OB1 and a plurality of second objects OB2 are simultaneously detected in the overlapping area RD, whether the first object OB1 and the second object OB2 are the same object can be determined.

B. Other Embodiments (B-1) According to the above-described first embodiment, the first external sensor 20 monitors the front area R1 that is positioned ahead of the own vehicle 10. The second external sensor 30 monitors the front side area R2 that is positioned obliquely ahead of the own vehicle 10. In this regard, for example, the first external sensor 20 may monitor a rear area that is positioned behind the own vehicle 10 and the second external sensor 30 may monitor a rear side area that is obliquely behind the own vehicle 10. In this case, a rearward direction may be referred to as the first direction. The rear area may be referred to as the first area. An obliquely rearward direction may be referred to as the second direction. The rear side area may be referred to as the second area.

(B-2) According to the above-described first embodiment, the first external sensor 20 includes the front millimeter-wave radar 21 and the front camera 22. The second external sensor 30 includes the front side millimeter-wave radar 31. In this regard, for example, the first external sensor 20 may include a light detection and ranging (LiDAR) or an ultrasonic radar instead of the front millimeter-wave radar 21. The first external sensor 20 may not include the front camera 22. For example, the second external sensor 30 may include a LiDAR or an ultrasonic radar instead of the front side millimeter-wave radar 31.

(B-3) In the object tracking apparatus 100 according to the above-described first embodiment, in the same object determination process, the second integrating unit 112 omits calculation of the score for determining whether the first object OB1 and the second object OB2 are the same object, when the moving state of the own vehicle 10 is turning at a predetermined steering angle or greater. In this regard, the second integrating unit 112 may not perform the same object determination process during a period in which the moving state of the own vehicle 10 is turning at a predetermined steering angle or greater.

(B-4) In the object tracking apparatus 100 according to the above-described first embodiment, the second integrating unit 112 calculates the score for determining whether the first object OB1 and the second object OB2 are the same object only when the moving state is braking to avoid a collision with the second object OB2 when the type of the first object OB1 detected in the overlapping area RD is another vehicle. In this regard, the second integrating unit 112 may calculate the score for determining whether the first object OB1 and the second object OB2 are the same object even when the moving state is not braking to avoid a collision with the second object OB2 when the type of the first object OB1 detected in the overlapping area RD is another vehicle.

(B-5) In the object tracking apparatus 100 according to the above-described first embodiment, the second integrating unit 112 calculates the position score and the speed score, and uses the score that is obtained by adding together the position score and the speed score as the score for determining whether the first object OB1 and the second object OB2 are the same object. In this regard, the second integrating unit 112 may use the position score as the score for determining whether the first object OB1 and the second object OB2 are the same object. In this case, the second integrating unit 112 may not calculate the speed score.

(B-6) In the object tracking apparatus 100 according to the above-described first embodiment, in the same object determination process, if a single first object OB1 is a candidate for the same object for a plurality of second objects OB2 when determining whether the first object OB1 and the second object OB2 are the same object based on the score of each pair, the second integrating unit 112 optimizes the combinations of the first objects OB1 and the second objects OB2 using the combination optimization algorithm such that a single first object OB1 is not a candidate for the same object for a plurality of second objects OB2.

In this regard, in the same object determination process, the second integrating unit 112 may not optimize the combinations of the first objects OB1 and the second objects OB2 using the combination optimization algorithm. For example, first, the second integrating unit 112 may select a first object OB1 of which the score is the greatest when paired with a first second object OB2. The second integrating unit 112 may then determine whether the selected first object OB1 and the second object OB2 are the same object. Next, the second integrating unit 112 may select a first object OB1 of which the score is the greatest when paired with a second object OB2, excluding the first object OB1 that is determined to be the same object as the first second object OB2. The second integrating unit 112 may then determine whether the selected first object OB1 and the second object OB2 are the same object. The second integrating unit 112 may successively determine the first object OB1 that is the same object as the second object OB2 in this manner.

The present disclosure is not limited to the above-described embodiments and may be implemented through various configurations without departing from the spirit of the present. For example, technical features according to embodiments may be replaced and combined as appropriate to solve some or all of the above-described issued or to achieve some or all of the above-described effects. Furthermore, the technical features may be omitted as appropriate unless described as a requisite in the present specification.

What is claimed is:
1. An object tracking apparatus comprising:
a processor;
a non-transitory computer-readable storage medium; and
a set of computer-executable instructions stored on the non-transitory computer-readable storage medium that cause the processor to:

receive first information that includes first position information indicating a position of a first object that is detected by a first external sensor that monitors a first area that is positioned in a first direction relative to a vehicle and first identification information for identifying the first object;

receive second information that includes second position information indicating a position of a second object that is detected by a second external sensor that monitors a second area that is positioned in a second direction that differs from the first direction relative to the vehicle and second identification information for identifying the second object; and combine the first information and the second information, wherein the first area and the second area include an overlapping area in which edge portions of the first area and the second area overlap each other, and set of computer-executable instructions further cause the processor to:

determine whether the first object and the second object that are simultaneously detected in the overlapping area are a same object using the first information and the second information; and combine the first information and the second information by recording the second identification information of the second information in the first information and deleting the second information, in response to determining that the first object and the second object that are simultaneously detected in the overlapping area are the same object.

2. The object tracking apparatus according to claim 1, wherein the set of computer-executable instructions further cause the processor to:

receive third information indicating a moving state of the vehicle; and not determine that the first object and the second object are the same object even when the first object and the second object are simultaneously detected in the overlapping area, in response to the moving state of the vehicle indicated in the third information being turning at a steering angle that that is prescribed in advance or greater.

3. The object tracking apparatus according to claim 2, wherein:

a brake apparatus is mounted to the vehicle and generates a braking force independency of receiving an operation by an occupant, in response to a collision with the first object and the second object being predicted;

the brake apparatus generates a stronger braking force when the collision with the first object is predicted, compared to when the collision with the second object is predicted; and the set of computer-executable instructions further cause the processor to:

receive fourth information indicating an operating state of the brake apparatus, wherein the first information includes classification information indicating a type of the first object; and combine the first information and the second information only in response to the brake apparatus being operating as a result of the collision with the second object being predicted in a case where the type of the first object is a vehicle.

4. The object tracking apparatus according to claim 3, wherein:

the first information includes first speed information indicating a relative speed of the first object relative to the vehicle;

the second information includes second speed information indicating a relative speed of the second object relative to the vehicle; and the set of computer-executable instructions further cause the processor to calculate a score that is based on a degree of similarity between the position indicated by the first position information and the position indicated by the second position information, and a degree of similarity between the relative speed indicated by the first speed information and the relative speed indicated by the second speed information, and determine whether the first object and the second object are the same object based on the score.

5. The object tracking apparatus according to claim 4, wherein the set of computer-executable instructions further cause the processor to calculate the score for each pair of the first object and the second object and determines whether the first object and the second object are the same object based on the score, in response to a plurality of first objects and a plurality of second objects being simultaneously detected in the overlapping area.

6. The object tracking apparatus according to claim 5, wherein the set of computer-executable instructions further cause the processor to optimize a combination using a combination optimization algorithm that is prescribed in advance such that a single second object is a candidate for the same object for a single first object, in response to a plurality of second objects being candidates for the same object for a single first object.

7. The object tracking apparatus according to claim 2, wherein:

the first information includes first speed information indicating a relative speed of the first object relative to the vehicle;

the second information includes second speed information indicating a relative speed of the second object relative to the vehicle; and the set of computer-executable instructions further cause the processor to calculate a score that is based on a degree of similarity between the position indicated by the first position information and the position indicated by the second position information, and a degree of similarity between the relative speed indicated by the first speed information and the relative speed indicated by the second speed information, and determine whether the first object and the second object are the same object based on the score.

8. The object tracking apparatus according to claim 7, wherein the set of computer-executable instructions further cause the processor to calculate the score for each pair of the first object and the second object and determines whether the first object and the second object are the same object based on the score, in response to a plurality of first objects and a plurality of second objects being simultaneously detected in the overlapping area.

9. The object tracking apparatus according to claim 8, wherein:
the set of computer-executable instructions further cause the processor to
optimize a combination using a combination optimization algorithm that is prescribed in advance such that a single second object is a candidate for the same object for a single first object, in response to a plurality of second objects being candidates for the same object for a single first object.

10. The object tracking apparatus according to claim 1, wherein:
a brake apparatus is mounted to the vehicle and generates a braking force independency of receiving an operation by an occupant, in response to a collision with the first object and the second object being predicted;
the brake apparatus generates a stronger braking force when the collision with the first object is predicted, compared to when the collision with the second object is predicted; and
the set of computer-executable instructions further cause the processor to:
fourth information indicating an operating state of the brake apparatus, wherein the first information includes classification information indicating a type of the first object; and
combine the first information and the second information only in response to the brake apparatus being operating as a result of the collision with the second object being predicted in a case where the type of the first object is a vehicle.

11. The object tracking apparatus according to claim 1, wherein:
the first information includes first speed information indicating a relative speed of the first object relative to the vehicle;
the second information includes second speed information indicating a relative speed of the second object relative to the vehicle; and
the set of computer-executable instructions further cause the processor to
calculate a score that is based on a degree of similarity between the position indicated by the first position information and the position indicated by the second position information, and a degree of similarity between the relative speed indicated by the first speed information and the relative speed indicated by the second speed information, and determines whether the first object and the second object are the same object based on the score.

12. The object tracking apparatus according to claim 11, wherein
the set of computer-executable instructions further cause the processor to
calculate the score for each pair of the first object and the second object and determines whether the first object and the second object are the same object based on the score, in response to a plurality of first objects and a plurality of second objects being simultaneously detected in the overlapping area.

13. The object tracking apparatus according to claim 12, wherein
the set of computer-executable instructions further cause the processor to
optimize a combination using a combination optimization algorithm that is prescribed in advance such that a single second object is a candidate for the same object for a single first object, in response to a plurality of second objects being candidates for the same object for a single first object.

14. An object tracking method comprising:
receiving first information that includes first position information indicating a position of a first object that is detected by a first external sensor that monitors a first area that is positioned in a first direction relative to a vehicle and first identification information for identifying the first object;
receiving second information that includes second position information indicating a position of a second object that is detected by a second external sensor that monitors a second area that is positioned in a second direction that differs from the first direction relative to the vehicle and second identification information for identifying the second object, the first area and the second area including an overlapping area in which edge portions of the first area and the second area overlap each other;
determining whether the first object and the second object that are simultaneously detected in the overlapping area are a same object using the first information and the second information; and
combining the first information and the second information by recording the second identification information of the second information in the first information and deleting the second information, in response to determining that the first object and the second object that are simultaneously detected in the overlapping area are the same object.

15. An object tracking system comprising:
a processor;
a non-transitory computer-readable storage medium; and
a set of computer-executable instructions stored in the computer-readable storage medium that, when read and executed by the processor, cause the processor to implement:
receiving first information that includes first position information indicating a position of a first object that is detected by a first external sensor that monitors a first area that is positioned in a first direction relative to a vehicle and first identification information for identifying the first object;
receiving second information that includes second position information indicating a position of a second object that is detected by a second external sensor that monitors a second area that is positioned in a second direction that differs from the first direction relative to the vehicle and second identification information for identifying the second object, wherein the first area and the second area includes an overlapping area in which edge portions of the first area and the second area overlap each other;
determining whether the first object and the second object that are simultaneously detected in the overlapping area are a same object using the first information and the second information; and
in response to determining that the first object and the second object that are simultaneously detected in the overlapping area are the same object, combining the first information and the second information by recording the second identification information of the second information in the first information and deleting the second information.

* * * * *